United States Patent
Kim et al.

(10) Patent No.: US 9,940,027 B2
(45) Date of Patent: Apr. 10, 2018

(54) METHOD AND PROCESSOR FOR RECORDING VARIABLE SIZE DATA, AND METHOD, PROCESSOR AND RECORDING MEDIUM FOR READING VARIABLE SIZE DATA

(71) Applicant: SAMSUNG ELECTRONICS CO., LTD., Suwon-si (KR)

(72) Inventors: Doo-hyun Kim, Seoul (KR); Sang-jo Lee, Suwon-si (KR); Do-hyung Kim, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 15 days.

(21) Appl. No.: 15/300,516

(22) PCT Filed: Mar. 31, 2015

(86) PCT No.: PCT/KR2015/003177
§ 371 (c)(1),
(2) Date: Sep. 29, 2016

(87) PCT Pub. No.: WO2015/152610
PCT Pub. Date: Oct. 8, 2015

(65) Prior Publication Data
US 2017/0123680 A1    May 4, 2017

(30) Foreign Application Priority Data

Mar. 31, 2014  (KR) .................... 10-2014-0037961

(51) Int. Cl.
*G06F 12/00* (2006.01)
*G06F 3/06* (2006.01)
*G06F 13/16* (2006.01)

(52) U.S. Cl.
CPC ............ *G06F 3/0608* (2013.01); *G06F 3/061* (2013.01); *G06F 3/0656* (2013.01); *G06F 3/0673* (2013.01); *G06F 13/1663* (2013.01)

(58) Field of Classification Search
CPC ...... G06F 3/0608; G06F 3/061; G06F 3/0656; G06F 3/0673; G06F 13/1663
See application file for complete search history.

(56) References Cited

U.S. PATENT DOCUMENTS

| 6,504,785 B1 | 1/2003 | Rao |
| 2002/0056029 A1 | 5/2002 | Marui |

(Continued)

FOREIGN PATENT DOCUMENTS

KR    1020120106748 A    9/2012

OTHER PUBLICATIONS

Communication dated Jun. 24, 2015, issued by the International Searching Authority in counterpart International Application No. PCT/KR2015/003177 (PCT/ISA/210 & PCT/ISA/237).

*Primary Examiner* — Shawn X Gu
(74) *Attorney, Agent, or Firm* — Sughrue Mion, PLLC (57) ABSTRACT

Disclosed is a method of recording variable size data. A first processor receives, from a second processor, a read parameter including information on a read address value of data which has been read by the second processor and is stored in an external memory, compares the read address value acquired from the received read parameter and a record address value for data previously recorded in the external memory by the first processor, and determines whether or not the first processor is to transmit data to the second processor on the basis of the comparison result.

11 Claims, 6 Drawing Sheets

(56) References Cited

U.S. PATENT DOCUMENTS

| | | |
|---|---|---|
| 2005/0198441 A1 | 9/2005 | Tokoro |
| 2006/0268913 A1 | 11/2006 | Singh et al. |
| 2012/0331234 A1* | 12/2012 | Hirao .................. G06F 12/084 |
| | | 711/135 |
| 2013/0136188 A1 | 5/2013 | Kumar et al. |

* cited by examiner

METHOD AND PROCESSOR FOR RECORDING VARIABLE SIZE DATA, AND METHOD, PROCESSOR AND RECORDING MEDIUM FOR READING VARIABLE SIZE DATA

TECHNICAL FIELD

Disclosed embodiments relate to a method and processor for recording variable size data, a method and processor for reading variable size data, and a recording medium.

BACKGROUND ART

In the process of recording and reading a large amount of data, fixed-size buffering is generally used. According to fixed-size buffering, a whole buffer is divided into certain-sized buffers, and buffering is performed on the basis of the divided buffers. Fixed-size buffering facilitates buffering control and thus is easy to implement. However, when the divided buffers have different amounts of data, it is unlikely that data corresponding to a maximum storable buffer size will be stored in each buffer, and storage efficiency of the buffers may be degraded.

To solve this problem, variable-size buffering may be used. According to variable-size buffering, data is sequentially stored in a buffer by actual amounts of data. Therefore, there is less buffer waste, but control is complicated. In particular, when different processors are in different states, control is constantly performed for a point in time at which recording will be performed or a point in time at which reading will be performed, so that a heavier load may be generated.

DETAILED DESCRIPTION OF THE INVENTION

Technical Problem

In a method of recording variable size data, it is possible to control reading of variable size data when different processors are in different states.

Technical Solution

A method for a first processor to record variable size data according to an embodiment includes: receiving, by the first processor, a read parameter including information on a read address value of data which has been read by a second processor and is stored in an external memory from the second processor; comparing the read address value acquired from the received read parameter and a record address value for data previously recorded in the external memory by the first processor; and determining whether or not the first processor is to transmit data to the external memory on the basis of the comparison result.

Advantageous Effects of the Invention

In a system for recording and reading variable size data, a first processor and a second processor which differ from each other mutually exchange status information of a process of recording variable size data and making a determination on the variable size data, and thus can reduce cost of control between the different processors, which is the problem of existing variable size buffering.

BEST MODE

A method for a first processor to record variable size data according to an embodiment may include: receiving, by the first processor, a read parameter including information on a read address value of data which has been read by a second processor and is stored in an external memory from the second processor; comparing the read address value acquired from the received read parameter and a record address value for data previously recorded in the external memory by the first processor; and determining whether or not the first processor is to transmit data to the external memory on the basis of the comparison result.

In the method for the first processor to record variable size data according to another embodiment my further include determining whether or not a unit of data transmitted from the first processor to the second processor during a certain time period corresponds to a unit of data preset in the second processor as a result of transmitting data from the first processor to the second processor and when it is determined that the unit of data transmitted from the first processor to the second processor corresponds to the unit of data preset in the second processor, transmitting a write parameter for initializing an index value of the second processor to the second processor.

In the method for the first processor to record variable size data according to another embodiment, the determining of whether or not the first processor is to transmit the data to the external memory comprises transmitting the data to the external memory when a difference between the read address value and the record address value is a preset value or more.

In the method for the first processor to record variable size data according to another embodiment, the data may include any one of information on a size of the data and information on a size of data to be transmitted next, and information on a value of an address in the external memory at which the data to be transmitted next is stored.

The method for the first processor to record variable size data according to another embodiment may further include initializing an internal index of the first processor, wherein a value of the internal index may increase when data of a data unit preset in the second processor is processed by the first processor, and may be initialized to zero when exceeding a preset value.

A method for a second processor to read variable size data according to another embodiment may include: receiving, by the second processor, a write parameter indicating that data has been recorded in an external memory from a first processor; determining whether or not to read the data from the external memory on the basis of the write parameter received from the first processor; and when it is determined to read the data from the external memory, transmitting a read parameter including read address values of the data which has been read in preset data units to the first processor.

The method for the first processor to record variable size data according to another embodiment the determining of whether or not to read the data from the external memory comprises extracting an index value included in the write parameter determining whether or not the extracted index value has a first value, wherein the index value has the first value when a size of the data recorded in the external memory from the first processor is included in a data processing unit of the second processor.

The method for the first processor to record variable size data according to another embodiment further comprises changing the index value included in the write parameter to a second value when reading of the data recorded in the external memory is finished.

The method for the first processor to record variable size data according to another embodiment may further include initializing an internal index of the second processor, wherein a value of the internal index of the second processor may increase when data of a data unit preset in the second processor is read from the external memory, and may be initialized to zero when exceeding a preset value.

A first processor according to an embodiment may include: an input unit configured to receive a read parameter including information on a read address value of data which has been read by a second processor and is stored in an external memory from the second processor; a comparison unit configured to compare the read address value acquired from the received read parameter and a record address value for data previously recorded in the external memory by the first processor; and a control unit configured to determine whether or not the first processor is to transmit data to the external memory on the basis of the comparison result.

In the first processor according to another embodiment, the control unit determines whether or not a unit of data transmitted from the first processor to the second processor during a certain time period corresponds to a unit of data preset in the second processor as a result of transmitting data from the first processor to the second processor, and transmits a write parameter for initializing an index value of the second processor to the second processor when it is determined that the unit of data transmitted from the first processor to the second processor corresponds to the unit of data preset in the second processor.

In the first processor according to another embodiment, the control unit transmits the data to the second processor when a difference between the read address value and the record address value is a preset value or more.

In the first processor according to another embodiment, the data may include any one of information on a size of the data and information on a size of data to be transmitted next, and information on a value of an address in the external memory at which the data to be transmitted next is stored.

In the first processor according to another embodiment, the control unit may initialize an internal index of the first processor, and a value of the internal index of the first processor may increase when data of a data unit preset in the second processor is processed by the first processor, and may be initialized to zero when exceeding a preset value.

A second processor according to an embodiment may include: a receiving unit configured to receive a write parameter indicating that data has been recorded in an external memory from a first processor; a control unit configured to determine whether or not to read the data from the external memory on the basis of the write parameter received from the first processor; and a transmitting unit configured to transmit a read parameter including read address values of the data having been read in preset data units to the first processor when it is determined to read the data from the external memory.

In the second processor according to another embodiment, the control unit extracts an index value included in the write parameter and determines whether or not the extracted index value has a first value, and wherein the index value has the first value when a size of the data recorded in the external memory from the first processor is included in a data processing unit of the second processor.

In the second processor according to another embodiment, the control unit changes the index value included in the write parameter to a second value when reading of the data recorded in the external memory is finished.

In the second processor according to another embodiment, the control unit stores the data read from the external memory in any one of at least one buffer in the second processor, and wherein the one of the at least one buffer is determined based on buffer specification information included in the initiation flag.

In the second processor according to another embodiment, the control unit may initialize an internal index of the second processor, and a value of the internal index of the second processor may increase when data of a data unit preset in the second processor is read from the external memory, and may be initialized to zero when exceeding a preset value.

MODE OF THE INVENTION

Hereinafter, embodiments of the present invention will be described in detail with reference to the accompanying drawings so that those of ordinary skill in the technical field to which the present invention pertains can readily implement the embodiments. However, the present invention can be implemented in various different forms and is not limited to the embodiments described herein. To clearly describe the present invention, parts irrelevant to the description will be omitted in the drawings, and like elements will be designated by like numerals throughout the specification.

In this specification, when a part is referred to as being "connected" to another part, it may not only be "directly connected" but also may be "electrically connected" to the other part via an intervening device. Also, when a part is referred to as "including" an element, this means that the part does not exclude another element and may further include another element unless stated otherwise.

The present invention will be described in detail below with reference to the accompanying drawings.

Figure 1:
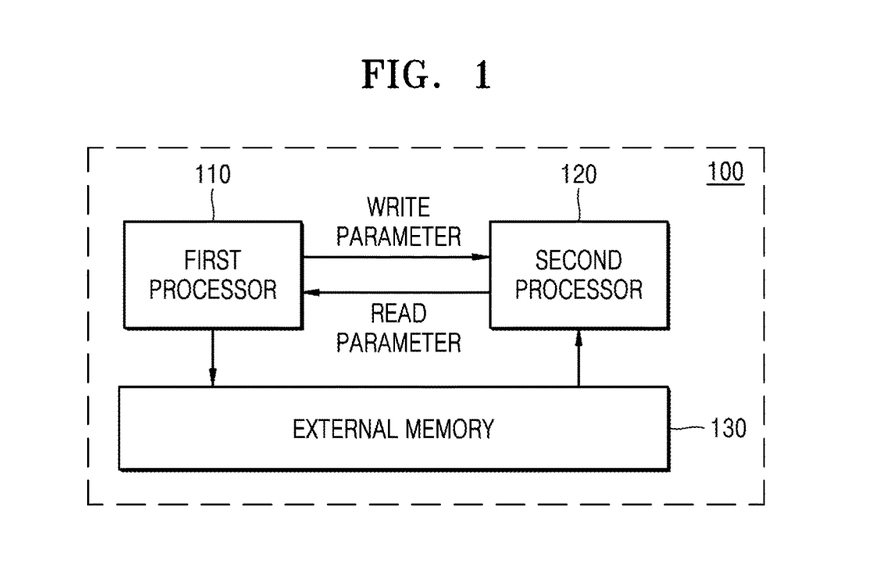
FIG. 1 is a diagram showing a system for recording and reading variable size data according to an embodiment.

FIG. 1 is a diagram showing a system 100 for recording and reading variable size data according to an embodiment.

FIG. 1 shows only elements related to the present embodiment in the system 100 for recording and reading variable size data. Therefore, those of ordinary skill in the technical field related to the present embodiment will appreciate that general-use elements other than the elements shown in FIG. 1 may be further included.

Referring to FIG. 1, the system 100 for recording and reading variable size data may include a first processor 110, a second processor 120, and an external memory 130.

The first processor 110 may process data according to a process which can be executed by the first processor and record the process result in the external memory 130. Here, the size of data may be variable rather than fixed. Also, the first processor 110 may exchange data with the second processor 120 and the external memory 130. In particular, the first processor 110 may exchange parameters including information on recording and reading of variable size data with the second processor 120.

The second processor 120 may read data recorded in the external memory 130 from the first processor 110. Since data recorded in the external memory 130 from the first processor 110 is variable, data read from the external memory 130 by the second processor 120 may also be variable.

Also, the second processor 120 may exchange data with the first processor 110 and the external memory 130. In particular, the second processor 120 may exchange parameters including information on recording and reading of variable size data with the first processor 110.

The external memory 130 may receive variable size data from the first processor 110 and store the received data. Also, the external memory 130 may transmit variable size data stored from the first processor 110 to the second processor 120.

In the system 100 for recording and reading variable size data according to an embodiment, the first processor 110 and the second processor 120 which differ from each other mutually exchange status information of the process of recording variable size data and making a determination on the variable size data, and thus can reduce cost of control between the different processors, which is the problem of existing variable size buffering.

A technology for recording and reading variable size data according to an embodiment will be described in further detail below.

Figure 2:
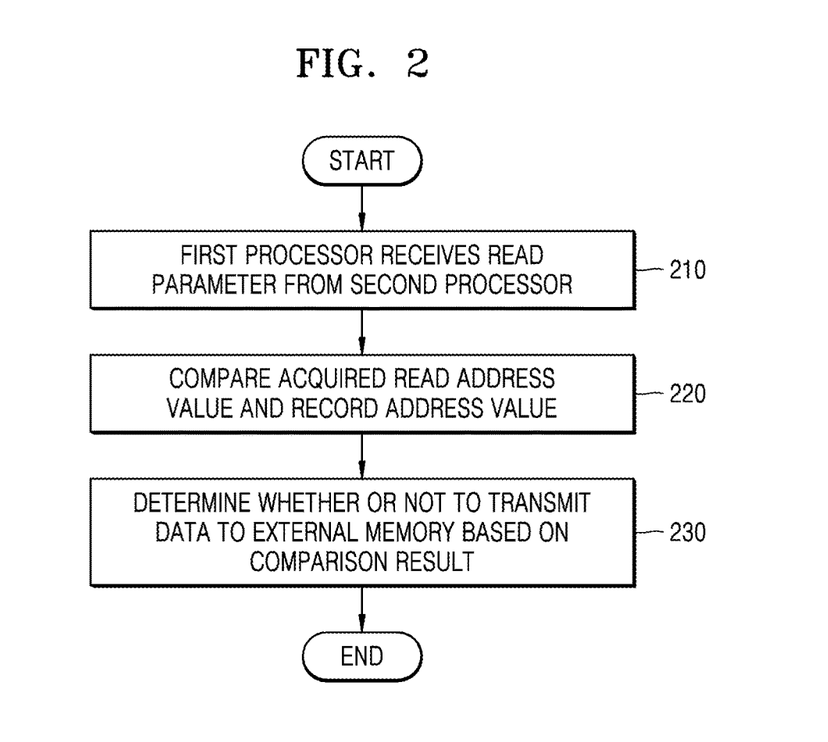
FIG. 2 is a flowchart illustrating a method for a first processor to record variable size data according to an embodiment.

FIG. 2 is a flowchart illustrating a method for the first processor 110 to record variable size data according to an embodiment.

In operation 210, the first processor 110 may receive a read parameter including information on a read address value of data which has been read by the second processor 120 and is stored in the external memory from the second processor 120.

The first processor 110 according to an embodiment may determine a speed of the process of the second processor 120 reading data on the basis of the information on the read address value included in the read parameter. Meanwhile, whenever data of a preset unit is read by the second processor 120, the first processor 110 may receive a read parameter.

As an example, the preset unit may be a unit of data recorded in the external memory 130 by the first processor 110. For example, when the first processor 110 records data in the external memory 130 in units of macroblock lines, the first processor 110 may receive a read parameter whenever data of a macroblock line unit is read by the second processor 120.

In operation 220, the first processor 110 may compare the read address value acquired from the received read parameter and a record address value for data previously recorded in the external memory 130 by the first processor 110.

From the received read parameter, the first processor 110 may extract the read address value of the data read from the external memory 130 by the second processor 120. Also, when the first processor 110 has most recently recorded data in the external memory 130, the record address value may be the value of an address in the external memory 130 at which the data is recorded.

In operation 230, the first processor 110 may determine whether or not to transmit data to the external memory on the basis of the comparison result.

When the comparison result of operation 220 indicates that a difference between the read address value and the record address value is a preset value or more, the first processor 110 may transmit the data to the external memory 130.

Here, the difference between the read address value and the record address value may include information on a difference in the speed of performing a process between the first processor 110 and the second processor 120. For example, when the difference between the read address value and the record address value is the preset value or more, a sequence in which the second processor 120 reads data is a certain level or higher, and thus it is possible not to overwrite data in the external memory 130 which has not yet been processed by the first processor 110.

On the other hand, when the difference between the read address value and the record address value is less than the preset value, the speed at which the second processor 120 reads data may be slower than the speed at which the first processor 110 records data. In this case, if the first processor 110 continuously records data in the external memory 130, the first processor 110 may overwrite data which has not yet been processed by the second processor 120 with other data, and thus the data which has not yet been processed by the second processor 120 may be lost.

Figure 3:
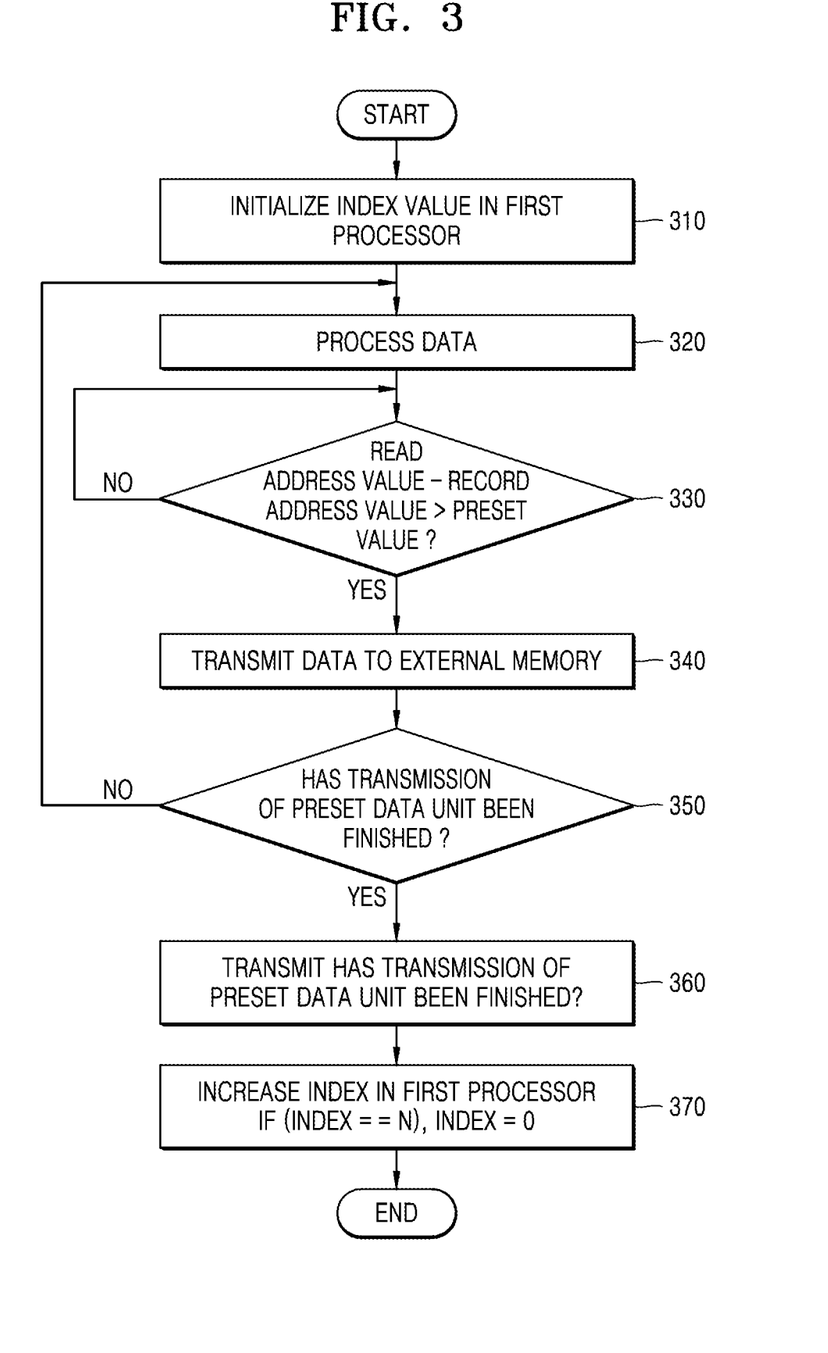
FIG. 3 is a flowchart illustrating a method of sharing edge information between different processes and buffering data according to an embodiment.

FIG. 3 is a diagram illustrating, in further detail, the method for the first processor 110 to record variable size data according to an embodiment.

In operation 310, the first processor 110 may initialize an index value in the first processor 110. For example, the first processor 110 may initialize an index value in the first processor to zero.

In operation 320, the first processor 110 may apply a certain process to data.

In operation 330, the first processor 110 may compare a read address value received from the second processor 120 and a record address value of data previously recorded in the external memory 130 from the first processor 110.

When a difference between the read address value and the record address value is a preset value or more, it is possible to perform operation 340 next. Meanwhile, a case in which the difference between the read address value and the record address value is less than the preset value denotes that an operation of the second processor 120 reading data is delayed. Therefore, a recording operation of the first processor 110 may be stopped for a certain time period so that a speed of the recording operation can be adjusted according to a speed of the reading operation of the second processor 120.

In operation 340, when the difference between the read address value and the record address value is the preset value or more, the first processor 110 may record the data on which the certain process has been performed in operation 320.

In operation 350, the first processor 110 may determine whether or not the amount of data corresponding to a preset data unit has been recorded in the external memory 130. Here, the preset data unit may be a unit of data processed by the second processor 120. For example, when the second processor 120 processes data in units of frames, the first processor 110 may determine whether or not the amount of data corresponding to a frame unit has been recorded in the external memory 130.

In operation 360, when the amount of data corresponding to the preset data unit has been recorded in the external memory 130, the first processor 110 may transmit a write parameter in which an index value has been set to one to the second processor 120. For example, when the amount of data corresponding to a frame unit has been recorded in the external memory 130, the first processor 110 may transmit a write parameter in which an index value has been set to one to the second processor 120.

In operation 370, when the amount of data corresponding to the preset data unit has been recorded in the external memory 130, the first processor 110 may increase the index value in the first processor 110.

Whenever the amount of data corresponding to the preset data unit is recorded in the external memory 130, the first processor 110 according to an embodiment may increase the index value in the first processor 110. However, at this time, the increased index value may be limited according to the size of the external memory 130.

For example, it is assumed that data of N frames can be stored in the external memory 130. Whenever data of a frame unit is recorded in the external memory, the first processor 110 may increase the index value. However, when the index value becomes N, the first processor 110 may initialize the index value to zero again.

Figure 4:
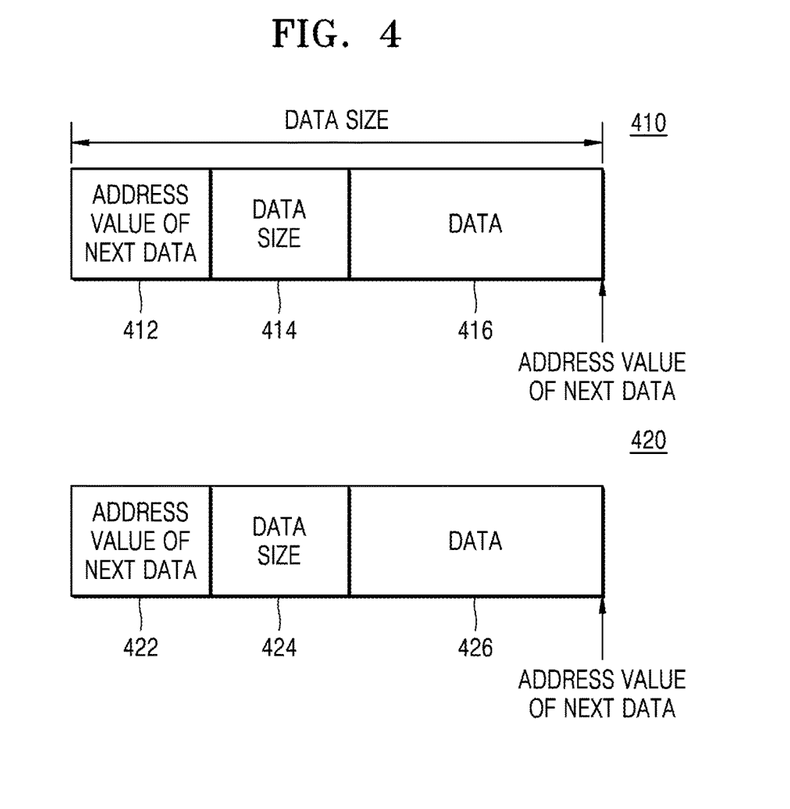
FIG. 4 is a diagram illustrating a data structure according to an embodiment.

FIG. 4 is a diagram illustrating a data structure according to an embodiment.

According to an embodiment, first data 410 may not only include data 416 which is substantially used in a process but may also include a data size 414 and an address value 412 of the next data.

According to an embodiment, data recorded in the external memory 130 by the first processor 110 may be variable size data. Since variable size data has a size which may change every time, the first processor 110 may not only require data but may also require a size of the data, information on an address at which the data is stored, etc. to record the data in the external memory 130 and read the data from the external memory 130.

Meanwhile, information on the address value 412 of the next data may be used to find an initial address value for initializing the external memory 130.

According to an embodiment, the second data 420 may not only include data 426 which is substantially used in a process but may also include a data size 424 and an address value 422 of the next data.

Meanwhile, a method for the first processor 110 to store variable size data in a variable buffer on the basis of the data structure shown in FIG. 4 according to an embodiment will be described in detail below with reference to FIG. 5.

Figure 5:
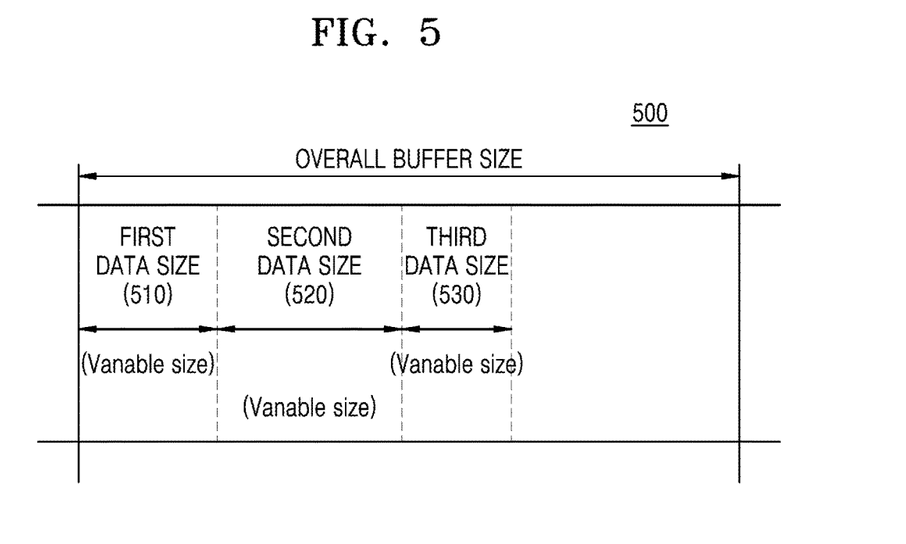
FIG. 5 is a diagram showing a variable buffer in which data is stored according to an embodiment.

FIG. 5 is a diagram showing the external memory 130 in which data is stored according to an embodiment.

Referring to FIG. 5, the external memory 130 may be divided into sizes of actual data rather than fixed intervals. For example, because the second data 420 has the largest size in FIG. 5, a memory in which the second data 420 is stored may have the largest size.

On the basis of the data size 414 acquired from the first data 410, the first processor 110 may determine a location in the external memory 130 at which the second data 420 that is the next data is recorded. Also, on the basis of the address 412 of the next data acquired from the first data, the first processor 110 may determine a location in the external memory 130 at which the second data 420 that is the next data is recorded.

Figure 6:
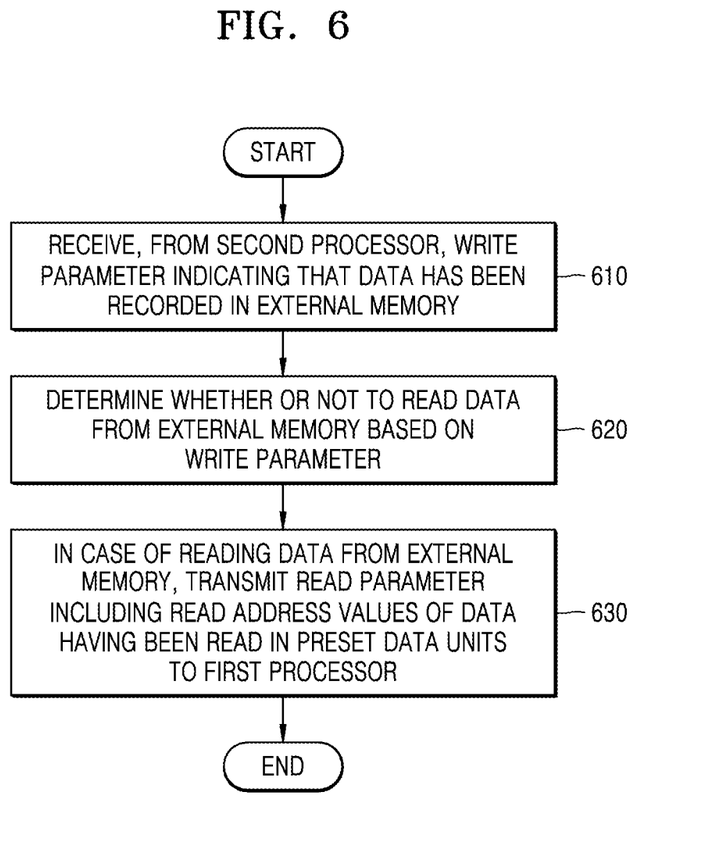
FIG. 6 is a flowchart illustrating a method for a second processor to read variable size data according to an embodiment.

FIG. 6 is a flowchart illustrating a method for the second processor 120 to read variable size data according to an embodiment.

In operation 610, the second processor 120 may receive a write parameter indicating that data has been recorded in the external memory 130 from the first processor 110.

According to an embodiment, when data of a certain unit is recorded in the external memory 130 from the first processor 110, the second processor 120 may receive a write parameter. Here, data of a certain unit may be a unit in which the second processor 120 processes data.

For example, the second processor 120 may process data in units of frames. In this case, when data of a frame unit is recorded in the external memory 130 from the first processor 110, the second processor 120 may receive a write parameter.

Meanwhile, the write parameter may include information which specifies any one of at least one buffer capable of storing data in the second processor 120. The second processor may store data read from the external memory 130 in the one of the at least one buffer specified on the basis of the information extracted from the write parameter.

In operation 620, the second processor 120 may determine whether or not to read the data from the external memory 130 on the basis of the write parameter received from the first processor 110.

To determine whether or not to read the data from the external memory 130, the second processor 120 according to an embodiment may extract an index value included in the write parameter. The second processor 120 may determine whether or not the extracted index value has a first value.

Meanwhile, the index value may have the first value when a size of the data recorded in the external memory 130 from the first processor 110 is included in a data processing unit of the second processor 120. For example, when the second processor 120 processes data in units of frames and the data recorded in the external memory 130 from the first processor 110 has the same size as a frame unit, the index value may have the first value.

When the amount of data corresponding to the unit of data processed by the second processor 120 is recorded in the external memory 130, the first processor 110 according to an embodiment may transmit a write parameter which causes the second processor 120 to read the data from the external memory 130 to the second processor 120.

In operation 630, when it is determined in operation 620 to read the data from the external memory 130, the second processor 120 may transmit a read parameter including read address values of the data which has been read in preset data units to the first processor 110.

As an example, the preset units may be units of data recorded in the external memory 130 by the first processor 110. For example, when the first processor 110 records data in the external memory 130 in units of macroblock lines, the first processor 110 may receive a read parameter whenever data of a macroblock line unit is read by the second processor 120.

Meanwhile, when the second processor 120 finishes reading the data recorded in the external memory 130, it is possible to change the index value included in the write parameter from the first value to a second value.

Figure 7:
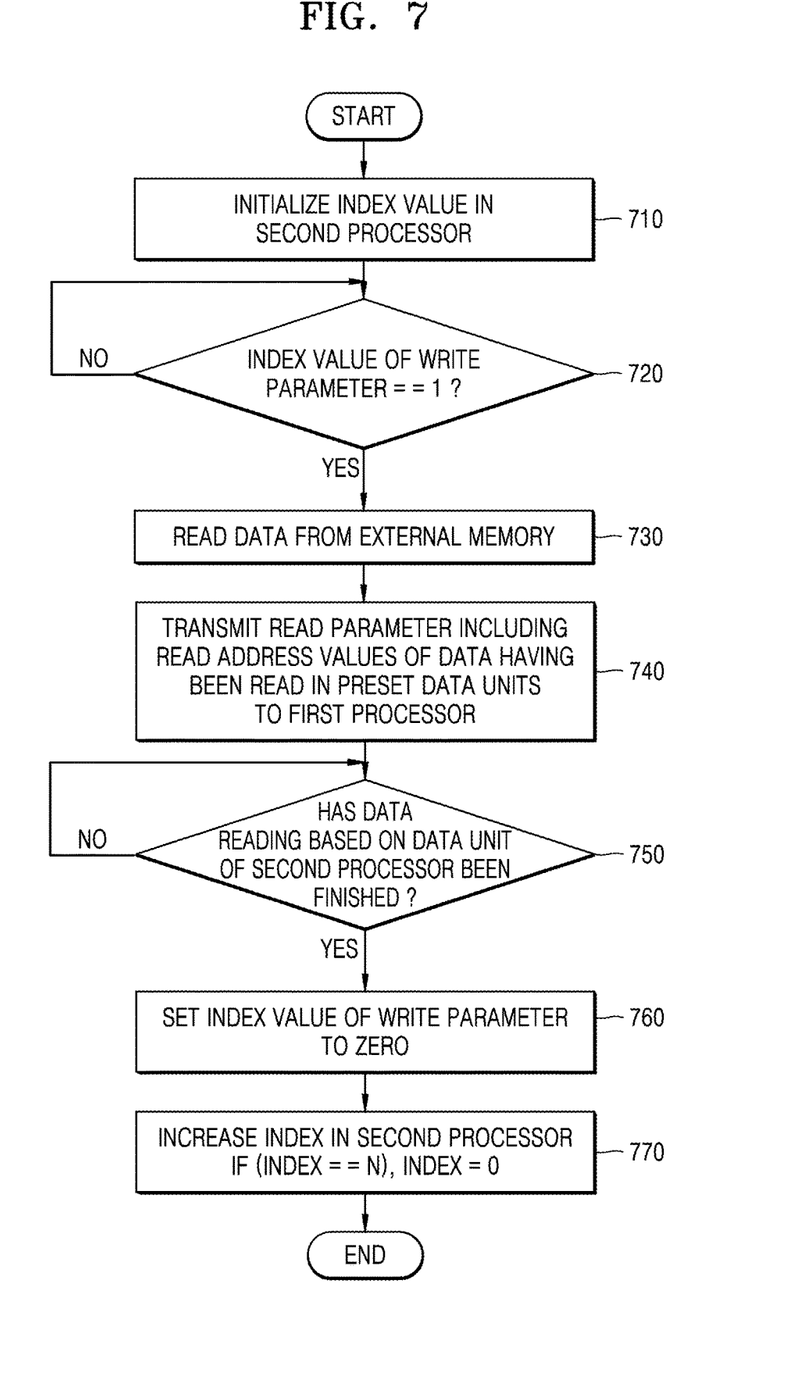
FIG. 7 is a flowchart illustrating, in detail, a method for a second processor to read variable size data according to an embodiment.

FIG. 7 is a flowchart illustrating in detail a method for the second processor 120 to read variable size data according to an embodiment.

In operation 710, the second processor 120 may initialize an index value in the second processor. For example, the second processor 120 may initialize the index value in the second processor by setting the index value to zero.

In operation 720, the second processor 120 may determine whether or not an index value of an extracted write parameter has a first value. Here, the index value of the write parameter may have the first value when a size of data recorded in the external memory 130 from the first processor 110 is included in a data processing unit of the second processor 120.

In operation 730, when the index value extracted from the write parameter has the first value, the second processor 120 may read the data from the external memory 130.

In operation 740, the second processor 120 may transmit a read parameter including read address values of the data which has been read in preset data units to the first processor 110.

In operation 750, the second processor 120 may determine whether or not data reading based on the data units of the second processor 120 has been finished. For example, the second processor 120

In operation 760, when data reading based on the data units of the second processor 120 has been finished, the second processor 120 may set the index value of the write parameter to zero.

In operation 770, whenever data reading based on the data units of the second processor 120 is finished, the second processor 120 may increase the index in the second processor 120. Therefore, if the data units of the second processor are frames, the index in the second processor may be increased whenever data reading is finished in a frame unit.

Meanwhile, when the second processor 120 has read data of frame units corresponding to N buffers included in the second processor 120 as a result of storing read data, the index may be initialized to zero.

Figure 8:
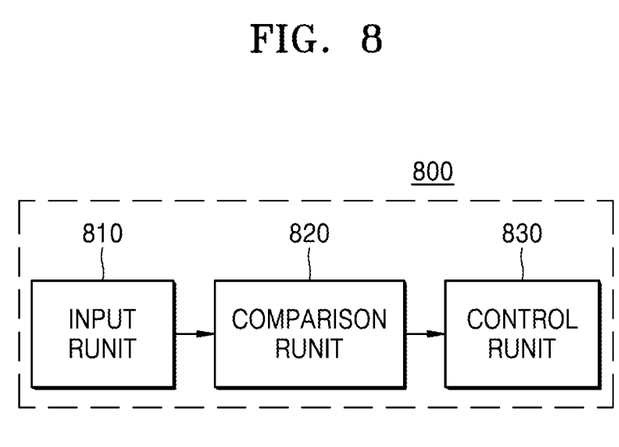
FIG. 8 is a block diagram of a first processor which records variable size data according to an embodiment.

FIG. 8 is a block diagram of a first processor 800 which records variable size data according to an embodiment. The first processor 800 in FIG. 8 may correspond to the first processor 800 in FIG. 1.

FIG. 8 shows only elements related to the present embodiment in the first processor 800 which records variable size data. Therefore, those of ordinary skill in the technical field related to the present embodiment will appreciate that general-use elements other than the elements shown in FIG. 8 may be further included.

Referring to FIG. 8, the first processor 800 which records variable size data may include an input unit 810, a comparison unit 820, and a control unit 830.

The input unit 810 may receive a read parameter including information on a read address value of data which has been read by the second processor 120 and is stored in the external memory from the second processor 120. Meanwhile, the input unit 810 may receive a read parameter whenever data of a preset unit is read by the second processor 120.

As an example, the preset unit may be a unit of data recorded in the external memory 130 by the first processor 110. For example, when the first processor 110 records data in the external memory 130 in units of macroblock lines, the input unit 810 may receive a read parameter whenever data of a macroblock line unit is read by the second processor 120.

The comparison unit 820 may compare the read address value acquired from the received read parameter and a record address value for data previously recorded in the external memory 130 by the first processor 110. From the received read parameter, the comparison unit 820 may extract the read address value of the data which has been read from the external memory 130 by the second processor 120. Also, when the first processor 110 has most recently recorded data in the external memory 130, the record address value may be the value of an address in the external memory 130 at which the data has been recorded.

The control unit 830 may determine whether or not to transmit data to the external memory 130 on the basis of the comparison result. The control unit 830 according to an embodiment may determine a speed of the process of the second processor 120 reading data on the basis of the information on the read address value included in the read parameter.

When the comparison result indicates that a difference between the read address value and the record address value is a preset value or more, the control unit 830 according to an embodiment may transmit the data to the external memory 130.

Here, the difference between the read address value and the record address value may include information on a difference in the speed of performing a process between the first processor 110 and the second processor 120. For example, when the difference between the read address value and the record address value is the preset value or more, a sequence in which the second processor 120 reads data is a certain level or higher, and thus it is possible not to overwrite data in the external memory 130 which has not yet been processed by the first processor 110.

Figure 9:
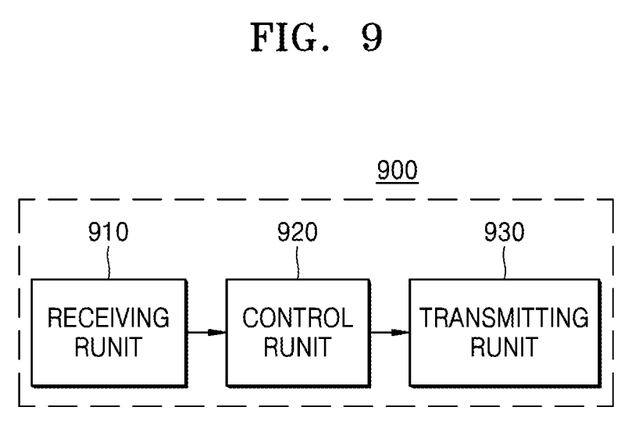
FIG. 9 is a block diagram of a second processor which reads variable size data according to an embodiment.

FIG. 9 is a block diagram of the second processor 900 which reads variable size data according to an embodiment. The second processor 900 in FIG. 9 may correspond to the second processor 120 in FIG. 1.

FIG. 9 shows only elements related to the present embodiment in the second processor 900 which reads variable size data. Therefore, those of ordinary skill in the technical field related to the present embodiment will appreciate that general-use elements other than the elements shown in FIG. 9 may be further included.

Referring to FIG. 9, the second processor 900 which reads variable size data may include a receiving unit 910, a control unit 920, and a transmitting unit 930.

The receiving unit 910 may receive a write parameter indicating that data has been recorded in the external memory 130 from the first processor 110.

According to an embodiment, when data of a certain unit is recorded in the external memory 130, the receiving unit 910 may receive a write parameter. Here, data of a certain unit may be a unit in which the second processor 900 processes data.

For example, the second processor 900 may process data in units of frames. In this case, when data of a frame unit is recorded in the external memory 130, the receiving unit 910 may receive a write parameter from the first processor 110.

On the basis of the write parameter received from the first processor 110, the control unit 920 may determine whether or not to read the data from the external memory 130.

The control unit 920 according to an embodiment may extract an index value included in the write parameter to determine whether or not to read the data from the external memory 130. The control unit 920 may determine whether or not the extracted index value has a first value.

Meanwhile, the index value may have the first value when a size of data recorded in the external memory 130 from the first processor 110 is included in a data processing unit of the second processor 900. For example, when the second processor 900 processes data in units of frames and the data recorded in the external memory 130 from the first processor 110 has the same size as a frame unit, the index value may have the first value.

When the amount of data corresponding to the unit of data processed by the second processor 900 is recorded in the external memory 130, the first processor 110 according to an embodiment may transmit a write parameter which causes the second processor 900 to read the data from the external memory 130 to the second processor 900.

When the data is read from the external memory 130 on the basis of the determination result of the control unit 920, the transmitting unit 930 may transmit a read parameter including read address values of the data which has been read in preset data units to the first processor 110.

As an example, the preset unit may be a unit of data recorded in the external memory 130 by the first processor 110. For example, when the first processor 110 records data in the external memory 130 in units of macroblock lines, the transmitting unit 930 may transmit a read parameter to the first processor 110 whenever data of a macroblock line unit is read by the control unit 920.

Meanwhile, when reading of the data recorded in the external memory 130 is finished, the control unit 920 may change the index value included in the write parameter from the first value to a second value.

An apparatus according to the present invention may include a processor, a memory for storing and executing program data, a permanent storage such as a disk drive, a communication port for communicating with an external device, a user interface device such as a touch panel, keys, or buttons, and so on. Methods embodied as a software module or an algorithm may be stored on computer-readable recording media as computer-readable code or program commands executable by the processor. The computer-readable recording media include magnetic storage media (e.g., read-only memories (ROMs), random-access memories (RAMs), floppy disks, hard disks, etc.), optical recording media (e.g., compact disc (CD)-ROMs, digital versatile discs (DVDs), etc.), and so on. The computer-readable recording media may also be distributed over computer systems connected through a network so that the computer-readable code can be stored and executed in a distributed manner. The media can be read by a computer, stored in a memory, and executed by the processor.

All references including publications, patent applications, patents, etc. cited herein are incorporated by reference to the same extent as if each reference were individually and specifically indicated to be incorporated by reference and were set forth in its entirety herein.

To facilitate understanding of the disclosed embodiments, reference numerals have been provided in the exemplary embodiments shown in the drawings. Although particular terms have been used to describe the embodiments, the present invention is not limited by the particular terms and may encompass all elements that may be generally conceived by those of ordinary skill in the art.

The present invention may be described in terms of functional blocks and various processing operations. Such functional blocks may be implemented by any number of hardware and/or software components that execute particular functions. For example, the present invention may employ various integrated circuit (IC) components, such as memory elements, processing elements, logic elements, look-up tables, etc., which may execute various functions under the control of one or more microprocessors or other control devices. Similarly, where the elements of the present invention are implemented by software programming or software elements, the present invention may be implemented by any programming or scripting language, such as C, C++, Java, assembler, etc., with various algorithms implemented by any combination of data structures, processes, routines, or other programming elements. Functional aspects may be implemented by an algorithm that is executed in one or more processors. Also, the present invention may employ the related art for electronic environment setting, signal processing, and/or data processing. Terms such as "mechanism," "element," "means," and "configuration" may be used in a broad sense and are not limited to mechanical and physical components. The terms may include the meaning of a series of software routines in conjunction with processors or so on.

Particular implementations described in the present invention are exemplary and do not limit the scope of the present invention in any way. For the sake of conciseness, descriptions of related electronic configurations, control systems, software, and other functional aspects of the systems may be omitted. Also, the connection lines or connection members between elements shown in the drawings represent exemplary functional connections and/or physical or logical connections, and may be presented as various alternative or additional functional connections, physical connections, or logical connections in a practical apparatus. Also, no element may be essential to the practice of the present invention unless the element is specifically described as "essential," "crucial," or so on.

The invention claimed is:

1. A method for a first processor to record variable size data, the method comprising:
   receiving, by the first processor, a read parameter including information on a read address value of data having been read by a second processor and stored in an external memory from the second processor;
   comparing the read address value acquired from the received read parameter and a record address value for data previously recorded in the external memory by the first processor; and
   determining whether or not the first processor is to transmit data to the external memory based on a result of the comparison.

2. The method of claim 1, further comprising:
   determining whether or not a unit of data transmitted from the first processor to the second processor during a certain time period corresponds to a unit of data preset in the second processor as a result of transmitting data from the first processor to the second processor; and
   when it is determined that the unit of data transmitted from the first processor to the second processor corresponds to the unit of data preset in the second processor, transmitting a write parameter for initializing an index value of the second processor to the second processor.

3. The method of claim 1, wherein the determining of whether or not the first processor is to transmit the data to the external memory comprises transmitting the data to the external memory when a difference between the read address value and the record address value is a preset value or more.

4. A non-transitory computer-readable recording medium storing a program for causing a computer to execute the method of claim 1.

5. A first processor for recording variable size data, the first processor comprising:
   an input unit configured to receive a read parameter including information on a read address value of data having been read by a second processor and stored in an external memory from the second processor;

a comparison unit configured to compare the read address value acquired from the received read parameter and a record address value for data previously recorded in the external memory by the first processor; and a control unit configured to determine whether or not the first processor is to transmit data to the external memory based on a result of the comparison.

6. The first processor of claim 5, wherein the control unit determines whether or not a unit of data transmitted from the first processor to the second processor during a certain time period corresponds to a unit of data preset in the second processor as a result of transmitting data from the first processor to the second processor, and transmits a write parameter for initializing an index value of the second processor to the second processor when it is determined that the unit of data transmitted from the first processor to the second processor corresponds to the unit of data preset in the second processor.

7. The first processor of claim 5, wherein the control unit transmits the data to the second processor when a difference between the read address value and the record address value is a preset value or more.

8. A second processor for reading variable size data, the second processor comprising:

a receiving unit configured to receive a write parameter indicating that data has been recorded in an external memory from a first processor;

a control unit configured to determine whether or not to read the data from the external memory based on the write parameter received from the first processor; and a transmitting unit configured to transmit a read parameter including read address values of the data having been read in preset data units to the first processor when it is determined to read the data from the external memory.

9. The second processor of claim 8, wherein the control unit extracts an index value included in the write parameter and determines whether or not the extracted index value has a first value, and wherein the index value has the first value when a size of the data recorded in the external memory from the first processor is included in a data processing unit of the second processor.

10. The second processor of claim 9, wherein the control unit changes the index value included in the write parameter to a second value when reading of the data recorded in the external memory is finished.

11. The second processor of claim 8, wherein the control unit stores the data read from the external memory in any one of at least one buffer in the second processor, and wherein the one of the at least one buffer is determined based on buffer specification information included in an initiation flag.

* * * * *